(12) United States Patent
Cervantes et al.

(10) Patent No.: US 11,235,803 B2
(45) Date of Patent: Feb. 1, 2022

(54) COUPLABLE AUTOMOTIVE ROAD VEHICLE WITH COMPACT STEERING AND SUSPENSION

(71) Applicant: COMMISSARIAT A L'ÉNERGIE ATOMIQUE ET AUX ENERGIES ALTERNATIVES, Paris (FR)

(72) Inventors: Valery Cervantes, Lyons (FR); Xavier Emmanuel Leblanc, Sourcieux les Mines (FR)

(73) Assignee: COMMISSARIAT A L'ÉNERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 125 days.

(21) Appl. No.: 16/652,337

(22) PCT Filed: Sep. 28, 2018

(86) PCT No.: PCT/FR2018/052400
§ 371 (c)(1),
(2) Date: Mar. 30, 2020

(87) PCT Pub. No.: WO2019/068997
PCT Pub. Date: Apr. 11, 2019

(65) Prior Publication Data
US 2020/0290673 A1    Sep. 17, 2020

(30) Foreign Application Priority Data

Oct. 3, 2017 (FR) ...................................... 17 59236

(51) Int. Cl.
*B62D 12/02* (2006.01)
*B60D 1/48* (2006.01)
(Continued)

(52) U.S. Cl.
CPC ............. *B62D 12/02* (2013.01); *B60D 1/481* (2013.01); *B60G 5/02* (2013.01); *B62D 47/006* (2013.01)

(58) Field of Classification Search
CPC .......... B60D 1/481; B60G 5/02; B62D 12/03; B62D 47/006
(Continued)

(56) References Cited

U.S. PATENT DOCUMENTS 3,222,224 A    12/1965 Williams et al.
4,217,970 A     8/1980 Chuka
(Continued)

FOREIGN PATENT DOCUMENTS

EP    1 046 574 A1    10/2000
EP    1 046 574 B1     8/2003
(Continued)

OTHER PUBLICATIONS

International Search Report dated Mar. 8, 2019 in PCT/FR2018/052400 filed on Sep. 28, 2018, citing documents AA-AD, AO-AQ and AS therein, 3 pages.

*Primary Examiner* — Kevin Hurley
*Assistant Examiner* — Felicia L. Brittman
(74) *Attorney, Agent, or Firm* — Oblon, McClelland, Maier & Neustadt, L.L.P.

(57) ABSTRACT

A couplable automotive road vehicle includes two front wheels, a chassis having a front part and a rear part, an articulated connection device, and front and rear couplings. A wheel cylinder is defined as the cylindrical geometric shape surrounding the two front wheels when the wheels are not turned. The front part of the chassis includes a chassis beam disposed behind the front wheels, outside the wheel cylinder. The front coupling includes a yaw rigid coupling module mounted on the chassis beam between the two front (Continued)

wheels. The vehicle includes, for each front wheel, a suspension arm mounted on the chassis beam and extending around the wheel cylinder, above same, and a tie rod for controlling the steering device, located above the wheel cylinder.

15 Claims, 5 Drawing Sheets

(51) Int. Cl.
*B60G 5/02* (2006.01)
*B62D 47/00* (2006.01)

(58) Field of Classification Search
USPC .......................................................... 280/408
See application file for complete search history.

(56) References Cited

U.S. PATENT DOCUMENTS

| | | |
|---|---|---|
| 2016/0016619 A1 | 1/2016 | Cervantes et al. |
| 2018/0265078 A1* | 9/2018 | Cervantes ................ B60D 1/30 |

FOREIGN PATENT DOCUMENTS

| | | | |
|---|---|---|---|
| EP | 1340670 B1 * | 1/2007 | ............... B60G 3/20 |
| EP | 2 964 512 A1 | 1/2016 | |
| FR | 1 372 546 A | 9/1964 | |
| FR | 3 040 360 A1 | 3/2017 | |
| RU | 2570184 C2 * | 12/2015 | ......... B60B 35/1063 |
| WO | WO-2013150099 A2 * | 10/2013 | ........... B60G 15/067 |

\* cited by examiner

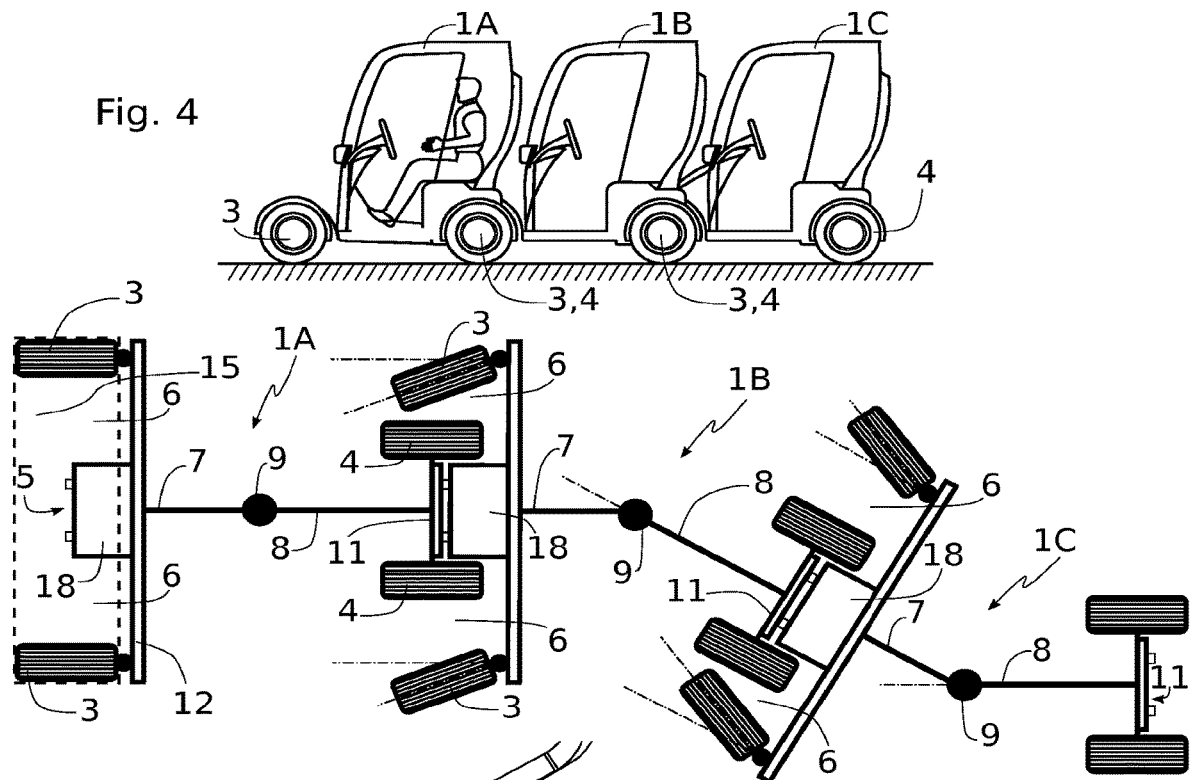
Fig. 4
Fig. 5
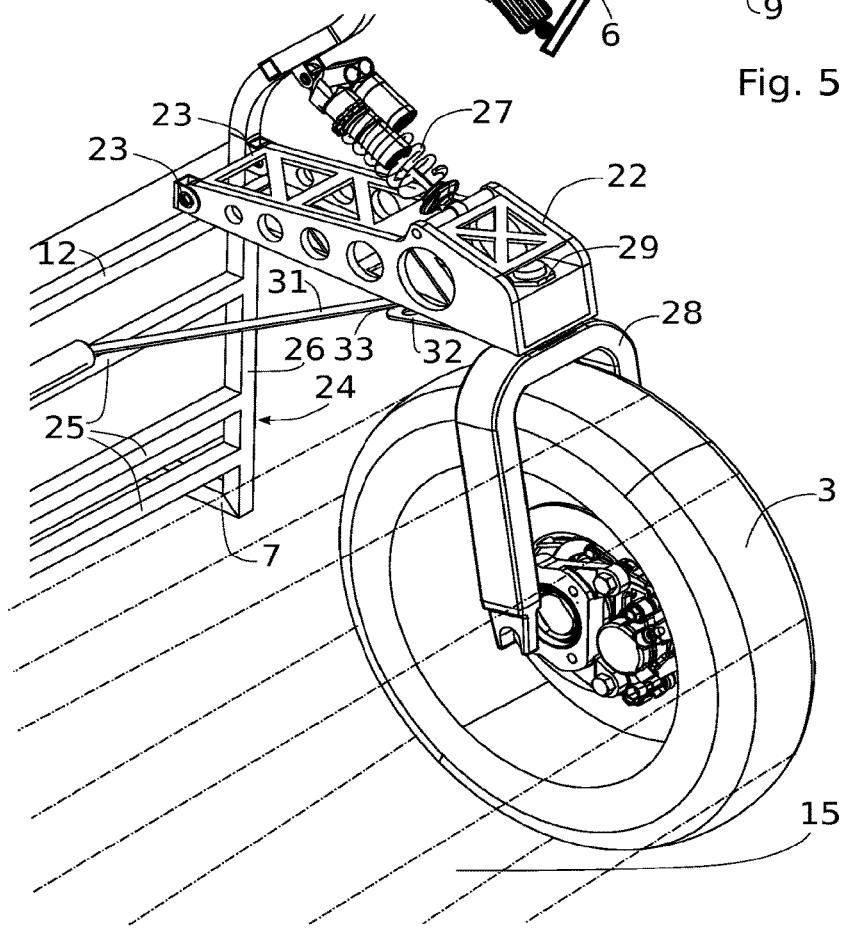
Fig. 6

COUPLABLE AUTOMOTIVE ROAD VEHICLE WITH COMPACT STEERING AND SUSPENSION

The invention relates to a couplable automotive road vehicle. The invention also relates to an automotive road convoy made up of a plurality of these vehicles.

Articulated automotive road vehicles are known that are able to be attached together by couplings without any degree of freedom for yaw rotation in order to form automotive road convoys with a single-track trajectory. Such a convoy is able to be driven by a single driver. Document EP 2964512 discloses an example of such vehicles for an urban mobility system.

These vehicles typically comprise:
- a set of front wheels comprising two wheels and a set of rear wheels comprising at least one wheel;
- a chassis comprising a front part, on which the set of front wheels is mounted, and a rear part, on which the set of rear wheels is mounted;
- an articulated connection device, interposed between the front and rear parts of the chassis, and allowing the front part to pivot relative to the rear part about an articulation axis normal to a running plane of the vehicle;
- a steering device able to modify the turning angle of the two wheels of the front set, this steering device being able to be activated independently of the articulated connection device;
- front and rear couplings, respectively located at the front and at the rear of the vehicle;
- the front coupling being alternately movable between:
  - a coupled position, in which this front coupling engages with a rear coupling, identical to the rear coupling of this vehicle and located on another vehicle, in order to mechanically attach, without any degree of freedom for yaw rotation, these vehicles together, and to align the front part of this vehicle with the rear part of the other vehicle; and
  - an uncoupled position, in which these vehicles are detached from each other;
- the rear coupling being alternately movable between:
  - a coupled position, in which this rear coupling engages with a front coupling, identical to the front coupling of this vehicle and located on another vehicle, in order to mechanically attach, without any degree of freedom for yaw rotation, these vehicles together, and to align the rear part of this vehicle with the front part of the other vehicle; and
  - an uncoupled position, in which these vehicles are detached from each other.

In the present description and in the claims, the terms "front" and "rear" refer to the normal direction of travel of the vehicle. The term "longitudinal direction" refers to the direction of travel of the vehicle and the term "transverse direction" refers to the direction perpendicular to the latter and parallel to the ground.

Compactness is a desired feature for this type of urban vehicle, since the more compact the vehicle, the easier it is to handle in an urban environment, whether on its own or coupled. However, when such a vehicle is provided with two front wheels, which is advantageous with respect to its road holding, this compactness during coupling is difficult to obtain.

In this description, an "articulated vehicle" denotes an automotive vehicle comprising the articulated connection device.

The term yaw rotation used herein denotes a rotation movement only about an axis perpendicular to the running plane of the vehicle. The running plane of a vehicle is defined as being the plane passing through the contact surfaces between the wheels of the vehicle and the road on which this vehicle circulates.

The coupling is said to be without any degree of freedom if, when two front and rear couplings are coupled together, the maximum yaw rotation angle of these couplings relative to each other due to the mechanical clearances is less than 10° or 5° or 3° or 2°.

The aim of the invention is to improve the couplable vehicles of the prior art. To this end, the aim of the invention is a couplable automotive road vehicle as described above, in which a wheel cylinder is defined as being the cylindrical geometrical shape surrounding the two front wheels when they are not turned and extending transversely between the two front wheels, and in which:
- the front part of the chassis comprises a chassis beam extending parallel to the axis of the wheel cylinder and disposed behind the front wheels, outside the wheel cylinder;
- the front coupling comprises a yaw rigid coupling module mounted on the chassis beam between the two front wheels, this module having a coupling axis substantially coaxial to the wheel cylinder;
- the vehicle comprises, for each front wheel:
  - a suspension arm mounted on the chassis beam and extending around the wheel cylinder from above;
  - a control tie rod (31) for the steering device controlling the pivoting of the wheel in order to modify the turning angle of the wheel, this tie rod being located above the wheel cylinder.

The "wheel cylinder" is defined, in the present description and in the claims, as being a geometrical shape surrounding the two front wheels, when they are not turned. Therefore, the wheel cylinder is a cylinder for which the two bases are disks each tangent to the outer side of a front wheel that is not turned. The steering curve of the wheel cylinder is the projection of the profile of a non-turned front wheel on a plane perpendicular to the axis connecting the axes of rotation of the front wheels. Therefore, the wheel cylinder can assume different configurations as a function of the assembly of the front wheels. For example, in the most common cases:
- when the front wheels are parallel, i.e. when they do not exhibit any camber, the wheel cylinder is a straight circular cylinder, each base of which is a disk delimiting the outer edge of a front wheel, with the same diameter as the wheel, the steering curve of which is a circle with the same diameter as the wheels, and for which the generatrices extend in the transverse direction, between the two wheels;
- when the front wheels exhibit a camber angle, the wheel cylinder is then a cylinder with an ellipsoidal steering curve, each base of which is a disk delimiting the outer edge of a front wheel, with the same diameter as the wheel, the steering curve of which is an ellipsis (the projection of the profile of a non-turned front wheel on a plane perpendicular to the axis connecting the axes of rotation of the front wheels), and for which the generatrices extend in the transverse direction, between the two wheels.

As an alternative embodiment, the bases of the wheel cylinder are spaced apart by 5 cm from the side of each front wheel.

For a suspension arm, extending around the wheel cylinder means that the suspension arm connects the chassis beam to the zone located above the wheel, without entering the wheel cylinder.

For a steering tie rod, passing above the wheel cylinder means that the tie rod enters a zone located:
   above a plane parallel to the running plane of the vehicle and passing through the axis of the wheel cylinder;
   outside the wheel cylinder.

The vehicle according to the invention is more compact, even though it is provided with two wheels at the front. When two of these vehicles are coupled together, the rear wheels of the front vehicle are inserted at the center and parallel to the front wheels of the rear vehicle. The invention allows this assembly to be maintained as close as possible to the chassis, while allowing the front wheels to pivot to ensure the function of the steering device of the rear vehicle, even when they are coupled together.

According to another aspect, the invention also relates to an automotive road convoy, comprising at least two attached automotive road vehicles, as described above, these vehicles being attached in pairs by means of the respective front and rear couplings of these vehicles.

The vehicle according to the invention can comprise the following additional features, taken individually or in combination:
   the size of the chassis beam, in the transverse direction of the vehicle, is greater than the size, in this transverse direction, of the yaw rigid coupling module;
   the chassis beam extends, in the transverse direction, on either side of the yaw rigid coupling module until it arrives opposite the tire tread of each front wheel;
   each suspension arm is disposed opposite the tire tread of the corresponding front wheel;
   the steering device comprises, for each front wheel, a steering lever pivotably secured to the wheel and connected by a ball joint to the control tie rod, said ball joint being located outside the wheel cylinder and on the top of the wheel cylinder;
   each suspension arm comprises, at the end thereof that is opposite the chassis beam, two flanges in the form of a jaw, a pivot of the steering device extending between the two flanges, and the steering lever being disposed between the two flanges;
   each steering lever is disposed opposite the tire tread of the corresponding front wheel;
   the yaw rigid coupling module comprises two coupling points defining a coupling axis parallel to the chassis beam;
   the coupling axis is contained in a 30 centimeter diameter cylinder that is coaxial to the wheel cylinder;
   the vehicle comprises a stabilizer bar connecting the two suspension arms and extending parallel to the chassis beam;
   the suspension arm is bent in order to extend around the wheel cylinder from above;
   each suspension arm is mounted for free rotation on the chassis beam along an axis parallel to the axis of the wheel cylinder;
   each suspension arm comprises an extension extending from the top of the wheel cylinder toward the hub of the corresponding front wheel, by running alongside the side of the corresponding front wheel, in the direction of the wheel pivot;
   each suspension arm is fixedly mounted on the chassis beam.

The aforementioned additional features particularly have the following advantages:
   the relative dimensions, in the transverse direction, of the chassis beam and of the yaw rigid coupling module allow a more compact configuration to be provided;
   bringing the chassis beam opposite the tire tread of each front wheel allows a suspension device and a steering device to be provided that frees up the space for nesting the rear wheels of the front vehicle, when coupling between a plurality of vehicles, which is the case when the suspension arms and/or elements of the steering device are disposed opposite the tire tread of the corresponding wheel, and/or above the wheel cylinder, outside the wheel cylinder;
   the jaw-shaped flanges of the suspension arms allow reliable and precise guidance of the elements ensuring steering, and strengthen the elements ensuring suspension, while guaranteeing minimum overall dimensions;
   the yaw rigid coupling module, when it comprises two coupling points, allows compact nesting of the set of front wheels with the set of rear wheels of another vehicle;
   the stabilizer bar fulfills a conventional stabilization function by creating a link between the front suspensions, and its path parallel to the chassis beam frees up the space of the wheel cylinder;
   the bent suspension arm allows simple and effective implementation for extending around the wheel cylinder from above;
   the configuration in which each suspension arm is mounted for free rotation on the chassis beam allows effective suspension to be produced, by connecting the suspension arm to the chassis beam, directly or indirectly, by interposing a damper-spring combination between these elements;
   the extension of the suspension arm allows the steering function to be implemented by a pivot or a steering knuckle disposed as close as possible to the wheel hub;
   alternatively, a suspension arm fixedly mounted on the chassis beam allows the suspension and steering functions to be provided by a telescopic device;
   the rear wheels have substantially the same diameter as the front wheels;
   alternatively, the rear wheels can have a diameter between 0.5 and 1.5 times the diameter of the front wheels.

A preferred embodiment of the invention will now be described with reference to the accompanying drawings, in which:

FIG. 4 shows an automotive road convoy made up of vehicles like that of FIG. 1;

FIG. 5 is a schematic top view of the structure of the convoy of FIG. 4;

FIG. 6 shows a first embodiment of the invention;

Throughout these figures, the same reference signs are used to denote the same elements.

Throughout the remainder of this description, the features and functions that are well known to a person skilled in the art are not described in detail.

Figure 1:
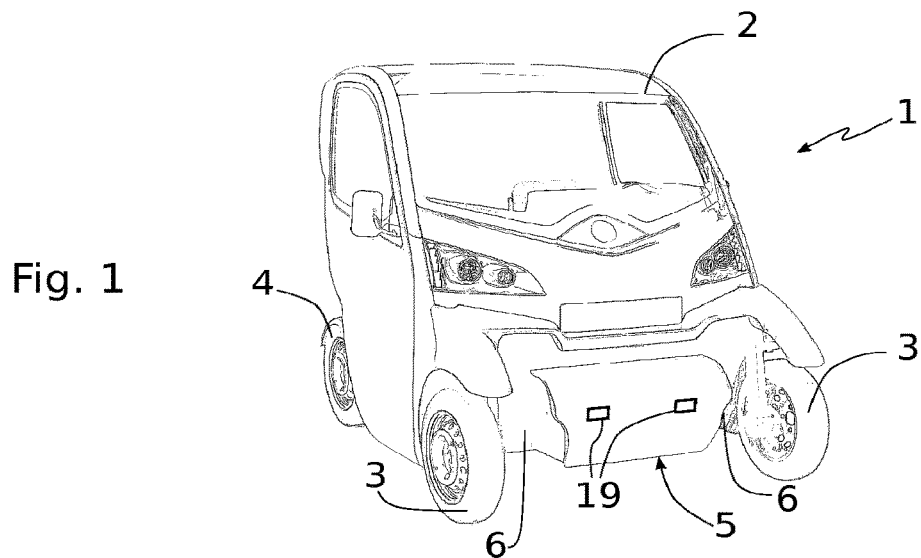
FIG. 1 shows a perspective view of a vehicle according to the invention.

FIG. 1 shows a perspective view of a couplable automotive road vehicle 1. This vehicle is similar to that disclosed in application EP 2964512. Thus, hereafter, only the technical details required to understand the invention will be described in detail.

The vehicle 1 comprises a passenger compartment 2, two front wheels 3 and two rear wheels 4. A front coupling 5 is disposed at the front of the vehicle 1, in the central position, which front coupling is intended to couple this vehicle to the rear of a compatible vehicle. To this end, the vehicle 1 comprises, on either side of the coupling 5, housings 6 intended to accommodate the rear wheels of the front vehicle in the event of coupling.

In the present example, the two rear wheels 4 are non-steering wheels, whereas the two front wheels 3 are steering wheels for directing the vehicle 1 when it is running or for correcting its trajectory when it forms part of a coupling. The steering wheels can be turned by pivoting about an axis. The non-steering wheels cannot be turned and are therefore permanently in a non-turned position.

Figure 2:
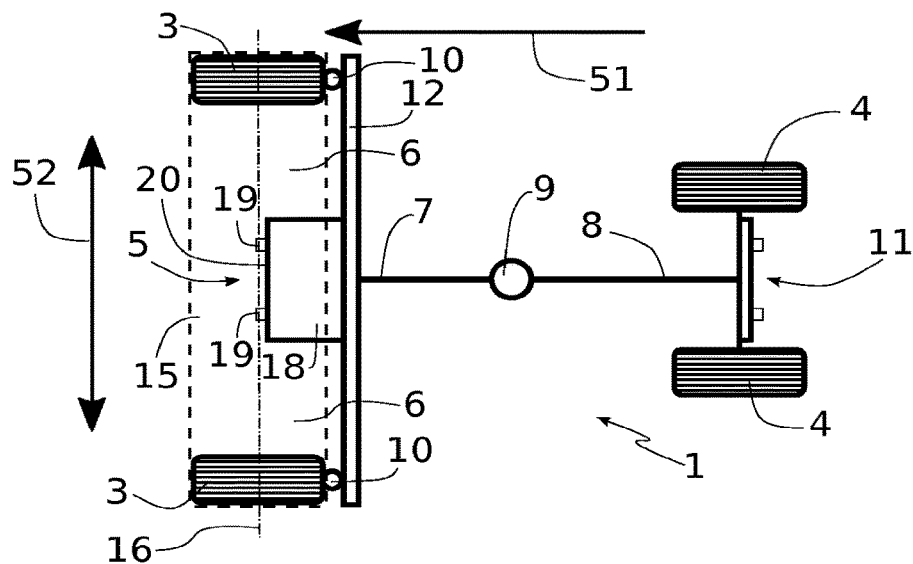
FIG. 2 is a schematic top view of the structure of the vehicle of FIG. 1.

FIG. 2 schematically shows the structure of the vehicle 1 as a top view.

In this example, this vehicle 1 comprises:
- a set of front wheels comprising the two front wheels 3;
- a set of rear wheels comprising the two rear wheels 4;
- a chassis, including a front part 7 and a rear part 8;
- an articulated connection device 9;
- a steering device 10 (schematically shown in FIGS. 2 and 3);
- a front coupling 5 and a rear coupling 11;
- one or more motors, such as electric motors, capable of propelling the vehicle 1, and preferably housed in the hub of the front 3 and/or rear 4 wheels in order to optimize the overall dimensions.

The passenger compartment 2 is mounted on the front part 7 of the chassis.

In the present description and in the claims, the terms "front" and "rear" refer to the vehicle 1 in its forward direction of travel, along the arrow 51 of FIG. 2. The longitudinal direction of the vehicle 1 is the direction of the arrow 51 and the transverse direction of the vehicle 1, referenced using the arrow 52, is the horizontal direction that is perpendicular to the longitudinal direction.

The relative terms such as "bottom", "top", "below", "above", "horizontally", "vertically", refer to the vehicle 1 when it is in the normal position, placed on a horizontal road.

Furthermore, a "wheel cylinder" 15 is defined as being a geometrical shape surrounding the two front wheels 3, when they are not turned. The wheel cylinder 15 is a cylinder, the base of which is a disk delimiting the outer edge of each front wheel 3, with the same diameter as these wheels 3, the steering curve of which is the projection of the profile of the wheel on a plane perpendicular to the axis connecting the two axes of the front wheels 3, and for which the generatrices extend in the transverse direction, between the two wheels. The present example that is described relates to the simplest case: the front wheels do not exhibit a camber angle, and the wheel cylinder is a straight circular cylinder.

The front coupling 5 and the steering device 10 are mounted on the front part 7, which also comprises a chassis beam 12. The chassis beam 12 extends in the transverse direction of the vehicle 1, by therefore being parallel to the axis 16 of the wheel cylinder 15. The size of the chassis beam 12, in the transverse direction, is greater than the size, in the transverse direction, of the front coupling 5 and preferably extends until it arrives opposite the tire tread of each front wheel 3.

The length (in the transverse direction) of the chassis beam 12 is, in the present example, substantially equal to the length (also in the transverse direction) of the wheel cylinder 15.

The term "opposite the tire tread of the wheel" denotes any zone located outside the wheel and inside a space delimited by two planes each tangent to a side of the wheel.

The articulated connection device 9 secures the two front 7 and rear 8 parts in a non-detachable manner, while allowing them to pivot relative to each other about an axis, called articulation axis, normal to a running plane of the vehicle 1, in order to modify an articulation angle θ (FIG. 3) of the vehicle 1.

The vehicle 1 is provided with mechanical devices and with actuators that are required to control the pivoting of the front 7 and rear 8 parts about the articulation axis, and also to block them in a determined angular position.

In the configuration of FIG. 2, the front 7 and rear 8 parts are aligned along the longitudinal axis, and the front wheels 3 are not turned. The vehicle 1 in this configuration is able to run in a straight line.

The wheels of the vehicle 1 are said to be non-turned when they are aligned together in a position such that an automotive vehicle, identical to the vehicle but in which the articulated connection device 9 is replaced by a rigid connection preventing any movement of the front 7 and rear 8 parts relative to each other, is able to move in a straight line.

Figure 3:
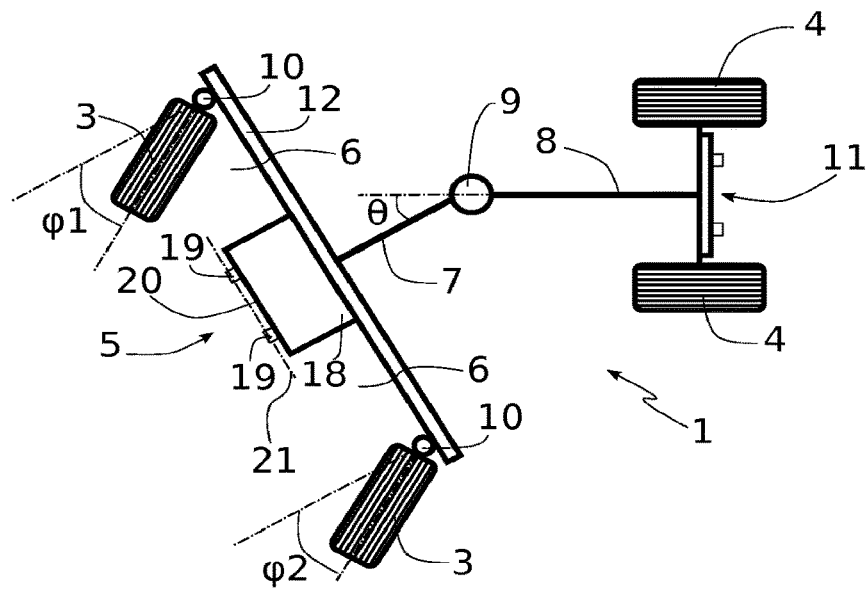
FIG. 3 is a view similar to FIG. 2 showing the articulation and turning possibilities of the vehicle.

FIG. 3 shows the vehicle 1 according to the same schematic view as FIG. 2 and shows:
- the front 7 and rear 8 parts forming an articulation angle θ by virtue of the articulated connection device 9;
- the front wheels 3 respectively forming a turning angle φ1 and an angle φ2.

The front 5 and rear 11 couplings are respectively located at the front and at the rear of the vehicle 1. In this case, these couplings 5, 11 are respectively anchored on the front 7 and rear 8 part of the chassis, without any degree of freedom for yaw rotation.

The front coupling 5 can alternately move between a coupled position and an uncoupled position. In its coupled position, the coupling 5 engages with the rear coupling of another vehicle, which is identical or compatible, in order to mechanically attach the vehicles. In the coupled position, the front part 7 of the vehicle 1 is mechanically connected, without any degree of freedom for yaw rotation, to the rear part of the chassis of the other vehicle.

To this end, the front coupling 5 comprises a yaw rigid coupling module 18 mounted on the chassis beam 12. The yaw rigid coupling module 18 comprises two attachments 19 for engaging with the rear coupling 11 of another vehicle. The two attachments 19 form two coupling points that are spaced apart along the transverse axis and ensure that the coupling is implemented without any degree of yaw freedom. Indeed, the module 18 must have at least two of these coupling points, which can be produced in various manners such as, for example, a single vertical bearing surface and extending in the transverse direction, two flanges of a coupling arm or even, as in the present example, by two attachments 19 connected to a bearing surface 20. The module 18 advantageously can be formed by a coupling known in the railway industry as a "Scharfenberg coupling". The coupling points, formed in the present example by the attachments 19, are aligned along a coupling axis 21 that is substantially coaxial to the wheel cylinder 15.

The coupling axis 21 in this case is considered to be coaxial to the wheel cylinder 15 when it is contained in a cylinder coaxial to the wheel cylinder 15 and has a diameter of 30 centimeters.

In the uncoupled position, the two vehicles are detached from each other, and are free to move independently of each other.

Similarly, the rear coupling 11 can alternately move between a coupled position and an uncoupled position. In its coupled position, the rear coupling 11 engages with the front coupling of another vehicle, which is identical or compatible, in order to mechanically attach these vehicles. To this end, the front 5 and rear 11 couplings are compatible.

FIG. 4 shows an automotive road convoy 53 made up of three vehicles 1 coupled together by virtue of their respective front 5 and rear 11 couplings. This convoy 53 is also shown in FIG. 5, as a top view of a schematic view in which the chassis structure is visible and which shows the possible work of the articulated connection devices 9 and of the steering devices. The front wheels 3 are shown non-turned on the first vehicle 1A of the convoy, whereas the front wheels 3 of the other two vehicles 1B, 1C are shown turned, which is possible when running or maneuvering, by the driver or by a servo-control device. Whether a vehicle is at the head, at the center, or at the end of the convoy, it can turn its front wheels or, on the contrary, keep them non-turned, with all the combinations being possible.

In the present example, the front wheels 3 and the rear wheels 4 of the vehicles have substantially the same diameter. When two vehicles are nested together, the rear wheels 4 of the front vehicle are placed substantially in the wheel cylinder 15 of the rear vehicle.

The vehicle 1 also comprises a suspension device.

Various embodiments of the suspension device and of the steering device will now be described with reference to FIGS. 6 to 13. In these figures, the elements with the same function have the same number from one embodiment to the next.

FIG. 6 shows a first embodiment. This view shows the front left-hand side wheel 3 of the vehicle 1 and shows its connection to the front part 7 of the chassis. The front right-hand wheel of the vehicle symmetrically uses the same elements. According to this first embodiment, the vehicle 1 comprises a chassis beam 12, extending in the transverse direction until it arrives opposite the tire tread of the wheel 3, as well as a suspension arm 22 mounted for free rotation along a transverse axis on the chassis beam 12.

The suspension arm 22 in this case is produced by a folded and perforated sheet forming a rigid beam withstanding the suspension forces. It is connected to the beam 12 by two bearings 23, allowing it to have the vertical travel required for the suspension to work.

The chassis beam 12 is secured to a chassis structure 24 comprising additional beams 25 parallel to the chassis beam and connected together by an upright 26 located at the transverse end of the beams 24, 25, i.e. opposite the tire tread of the wheel 3.

The suspension arm 22 is also connected to the upright 26 by a conventional damper-spring combination 26.

The suspension device also comprises a fork 28 connected by a pivot 29 to the suspension arm 22, at the end thereof opposite the bearings 23. The pivot 29 in the present example is substantially vertical. This pivot allows the wheel 3 to be turned and contributes to the function of the steering device. The fork 28 is, at the other end thereof, connected to the hub of the wheel 3. In order to simplify the figure, the rim of the wheel 3 is not shown.

Optionally, an electric motor can be disposed in the wheel 3 and/or, as shown in FIG. 6, a braking device 30 also can be disposed in the wheel 3.

The steering device further comprises a control tie rod 31 connected, by a ball joint 33, to a steering lever 32, which is secured to the fork 28. The control tie rod 31 is connected, by the end thereof opposite the ball joint 33, to a conventional steering rack and pinion (not shown), which meshes with the flywheel of the vehicle and/or another control device, such as an actuator. The movement of the control tie rod 31 in the transverse direction, initiated by the driver of the vehicle or by an assistance device, therefore controls the turning of the wheel 3.

Figure 7:
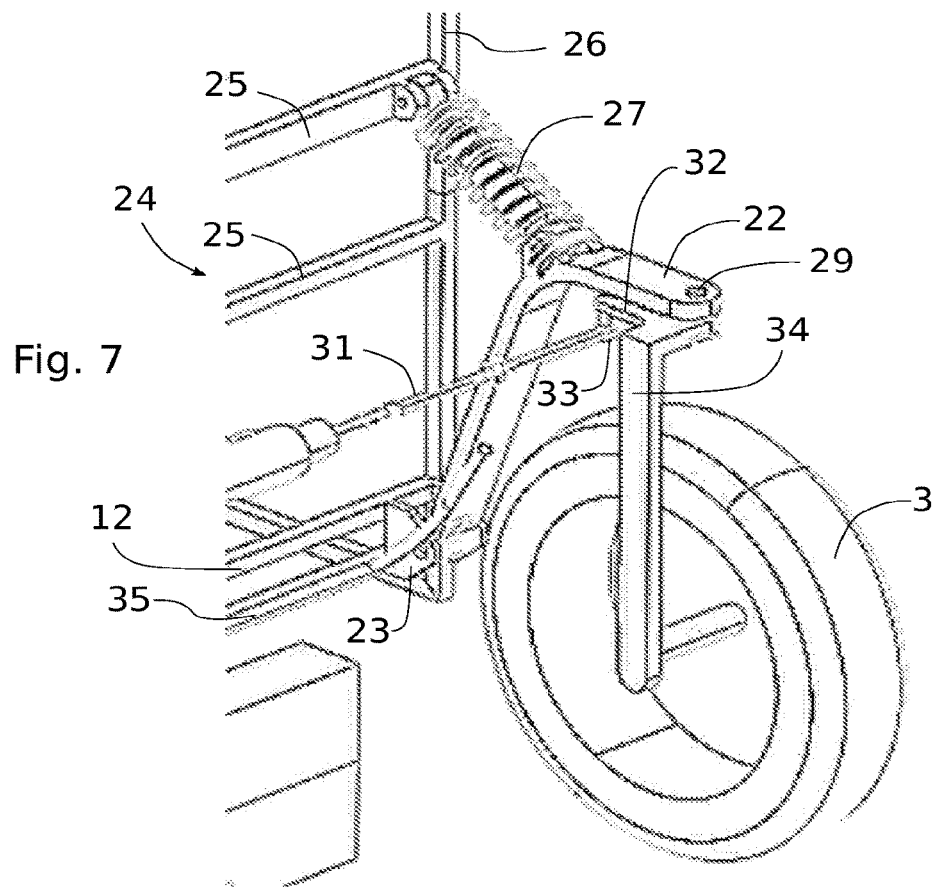
FIG. 7 shows a second embodiment of the invention.

FIG. 7 shows a second embodiment of the invention. As before, this figure shows the front left-hand side wheel of the vehicle 1.

According to this second embodiment, the chassis beam 12 is in a lower position than in the previous embodiment, it substantially extends in the same horizontal plane as the hub of the wheel 3. This chassis beam 12 extends in the transverse direction, until it arrives opposite the tire tread of the wheel 3. In this zone opposite the tire tread of the wheel 3, the chassis beam comprises bearings 23 allowing a suspension arm 22 to be assembled, allowing it to have vertical travel. In the present example, the bearings 23 have a substantially transverse articulation axis.

The suspension arm 22 in this case is bent. At the portion thereof that forms an angle, it is fastened to an additional beam 25 of the chassis structure 24.

At the end thereof opposite the bearings 23, the suspension arm 22 is connected, by a pivot 29, to a single-arm fork 34, which extends from one side of the wheel 3 toward the hub of the wheel 3. In the example of FIG. 7, the single-arm fork 34 extends on the inner side of the wheel 3. As an alternative, it can extend on the outer side of the wheel, thus completely freeing up the wheel cylinder of any suspension and steering element.

The single-arm fork 34 comprises, near the pivot 29, a steering lever 32 fastened by a ball joint 33 to a control tie rod 31 for the steering device, as in the previous embodiment.

The suspension device further comprises a stabilizer arm 35 fixed, by one of the ends thereof, on the suspension arm 22. The stabilizer arm extends in the transverse direction, along the chassis beam, and is fixed, by the other end thereof, on the suspension arm on the other side of the vehicle, that which engages with the front right-hand side wheel (not shown in FIG. 7).

Figure 8:
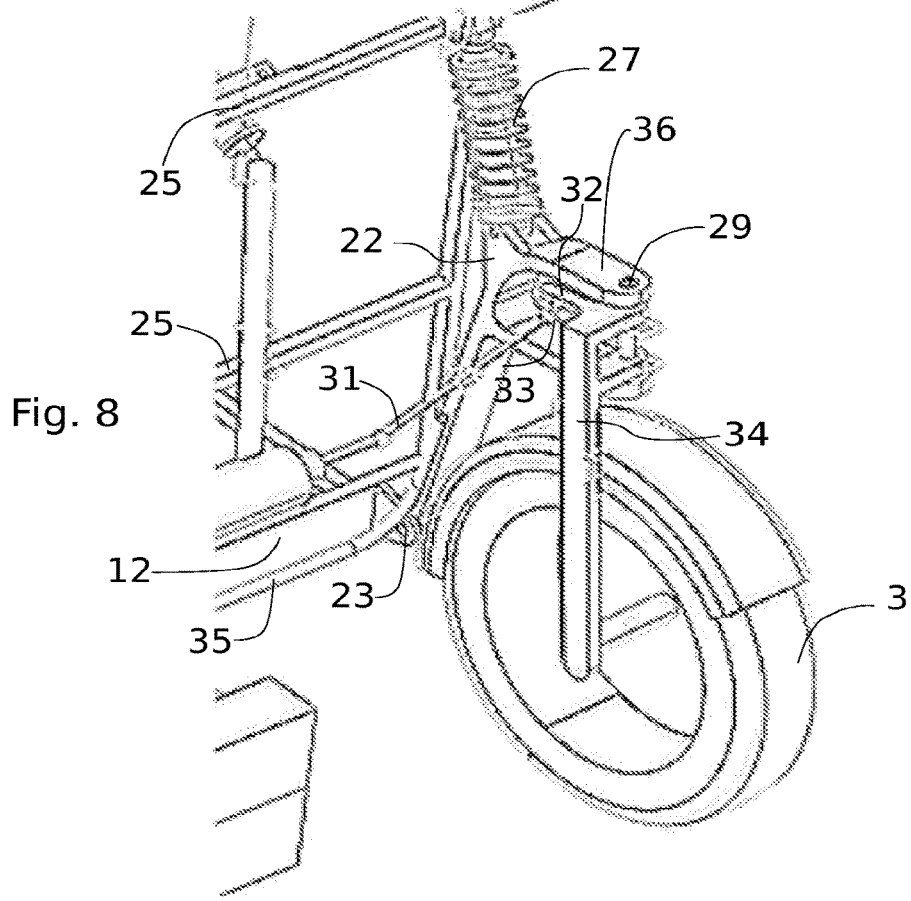
FIG. 8 shows a third embodiment of the invention.

FIG. 8 shows a third embodiment of the invention. This embodiment is similar to the second embodiment. A bent suspension arm 22 extends around the wheel cylinder 15 with, at one of the ends thereof, pivots 29 for fastening it to the chassis beam 12, and at the other end thereof, a pivot 29 for fastening it to a single-arm fork 34. A stabilizer bar 35 and a steering control tie rod 31 are also present.

According to this third embodiment, the suspension arm 22 has two flanges 36 in the form of a jaw at the pivot 29, so that said pivot extends between the two flanges 36.

The space between the two flanges 36 is used for housing and protecting the steering lever 32. The substantially vertical pivot 29, which is longer, also allows long guidance of the rotation of the single-arm fork 34 that is more reliable and more precise.

The suspension arm 22 is stiffened by the presence of the flanges 36, in particular in the vicinity of its attachment to the damper-spring combination 27.

In the first, second and third embodiments, the suspension arm 22 extends around the wheel cylinder 15 (schematically shown as dot-and-dash lines in FIG. 6), while the control tie rod 31 is located above the wheel cylinder 15. More specifically, in these embodiments, the suspension arm 22 extends around the front wheel while remaining opposite the tire tread of the wheel 3, when it is not turned. Furthermore, in these embodiments, the ball joint 33 connecting the tie rod 31 and the lever 32 is also opposite the tire tread of the wheel 3.

Figure 9:
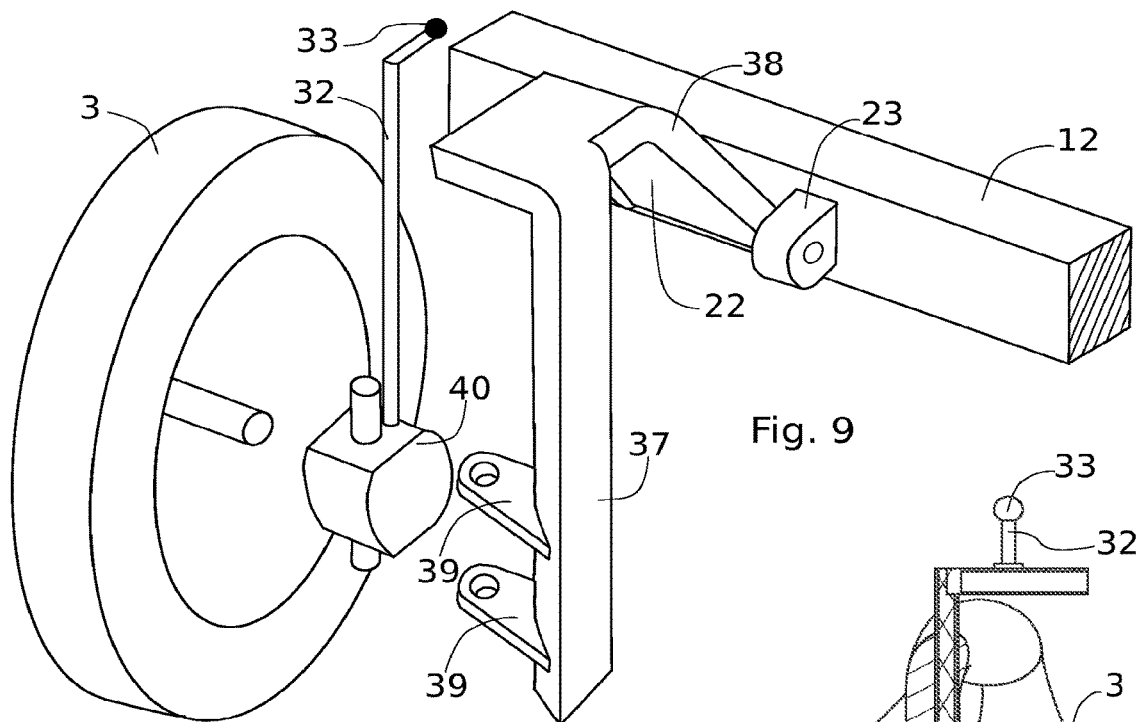
FIG. 9 shows a fourth embodiment of the invention.

FIG. 9 shows a fourth embodiment of the invention. FIG. 9 is an exploded view of the front right-hand side wheel of a vehicle 1, of its suspension device and of its steering device.

In this embodiment, a suspension arm 22 is disposed opposite the tire tread of the wheel 3 and extends around the wheel cylinder 15 from above. The suspension arm 22 is mounted for free rotation on the chassis beam 12. A damper-spring combination (not shown in FIG. 9) fulfills its function between the suspension arm 22 and the chassis beam 12.

According to this embodiment, the suspension arm 22 comprises an extension 37 aligned with the axis of the pivot 29, and which in this case is substantially vertical, and extending toward the hub of the wheel 3. The extension 37 extends laterally to the body of the suspension arm 22, from its inner edge 38, so as to run alongside the wheel 3 along its inner side.

The extension 37 of the suspension arm 22 supports, in the vicinity of the hub of the wheel 3, bearings 39 for providing a pivot link with a steering knuckle 40. The hub of the wheel 3 is rotationally mounted in the steering knuckle 40 to allow the wheel 3 to rotate.

The turning movement of the wheel 3 is allowed by the pivot link between the steering knuckle 40 and the extension 37. This movement is controlled by a steering lever 32 secured to the steering knuckle 40 by one of the ends thereof. At the other end thereof, the steering lever 32 comprises a ball joint 33 so that it can be connected with a control tie rod of the steering device (not shown in FIG. 9), which passes above the wheel cylinder 15.

Figure 11:
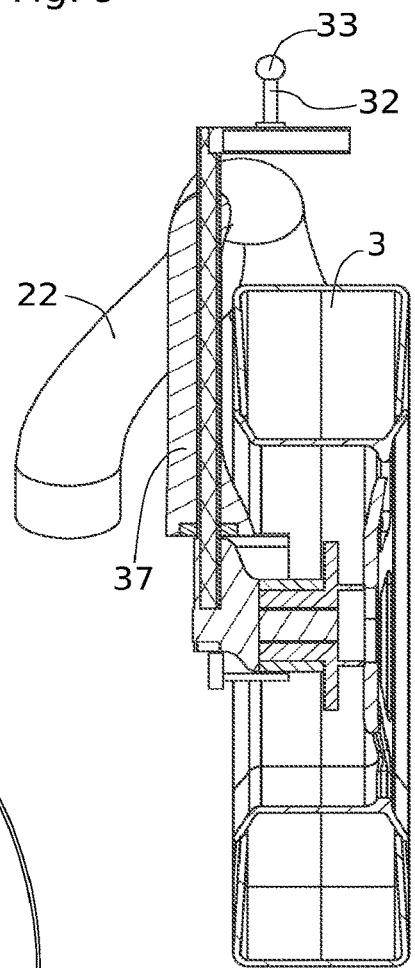
FIGS. 10 and 11 show a fifth embodiment of the invention.
Figure 10:
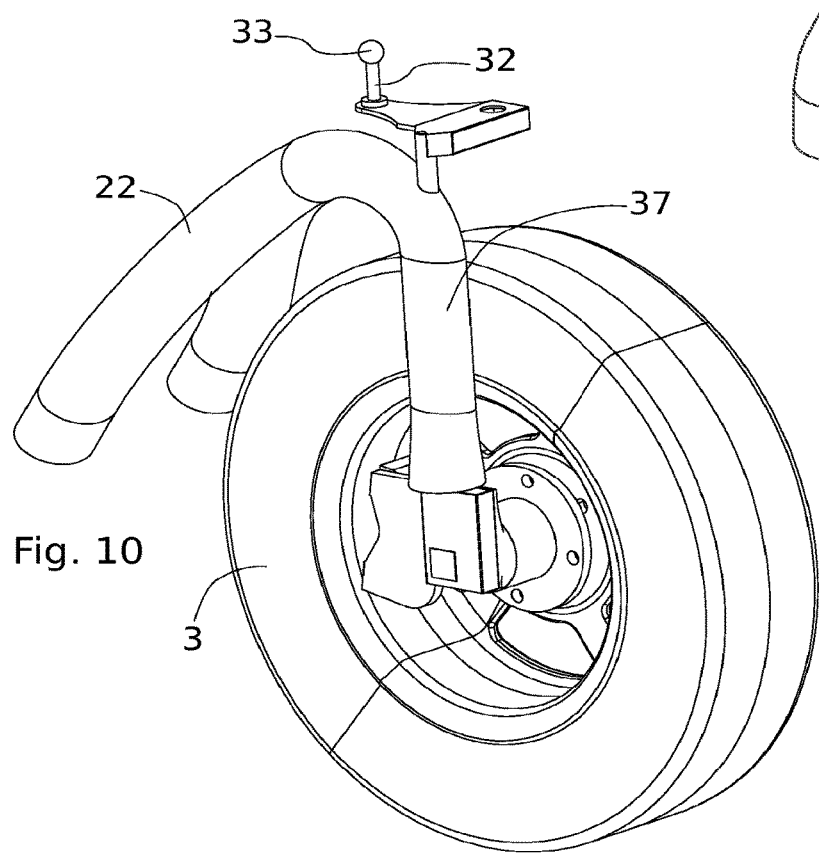

FIGS. 10 and 11 show a fifth embodiment of the invention. According to this embodiment, the suspension arm 22 is produced from a Y-shaped tubular material that allows the wheel cylinder 15 to be extended around from above. The suspension arm 22 also comprises, similar to the previous embodiment, an extension 37, which is also tubular and which extends substantially vertically along the inner side of the wheel 3 up to the hub of the wheel 3.

The extension 37 is, at the end thereof, pivotably linked along a substantially vertical axis with a steering knuckle 40, which is connected to the hub of the wheel 3 (see FIG. 11, which is a vertical section view passing through the extension 37).

A steering lever 32 is secured to the steering knuckle 40 and passes through the extension tube 37 in order to emerge on the upper part thereof, where it can be connected by a ball joint 33 to a control tie rod 31 of the steering device (not shown in FIGS. 10 and 11). The steering lever 32 and the extension 37 are pivotably linked so that the lever 32 can pivot in the extension 37.

At the end of the suspension arm that is opposite the hub of the wheel 3, the suspension arm 22 is pivotably linked, by virtue of a substantially transverse pivot, with the chassis beam (not shown), as in the preceding embodiments.

Figure 12:
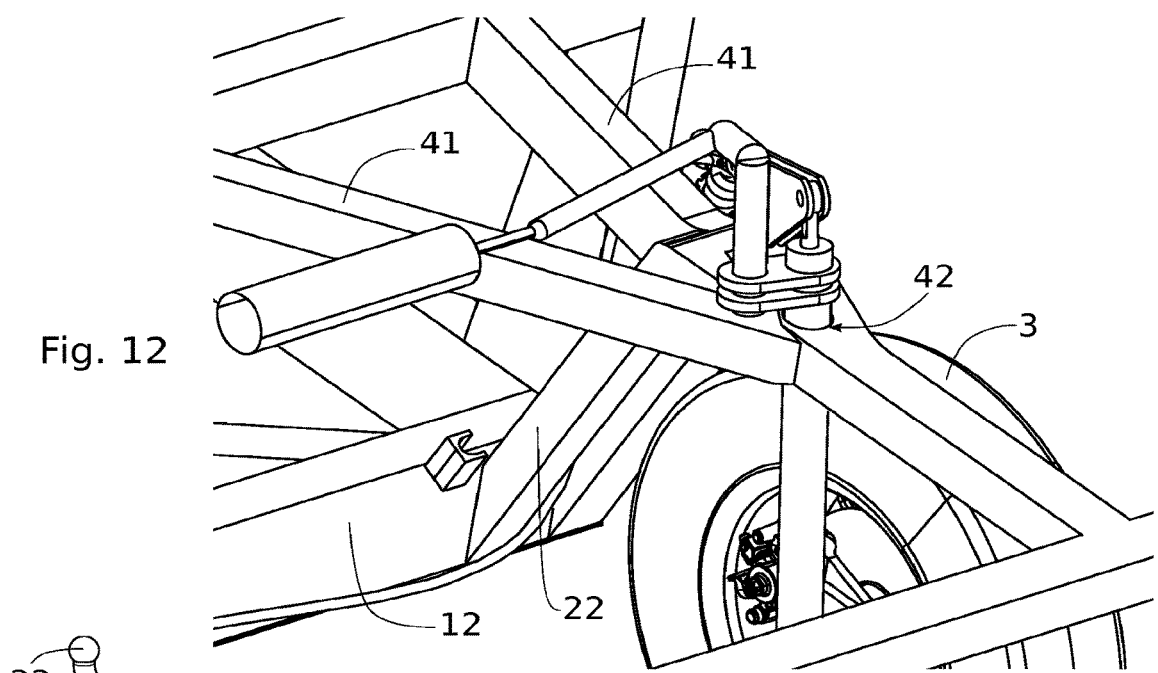
FIG. 12 shows a sixth embodiment of the invention.

FIG. 12 shows a sixth embodiment of the invention, in which the suspension arm 22 is fixedly mounted on the chassis beam 12. Indeed, the suspension arm 22 is fixed, via its base, on the chassis beam 12 and extends around the wheel cylinder 15, whereas two stiffening cross-members 41 strengthen the assembly by being fixed on an additional beam 25 of the chassis structure 24.

The suspension arm 22 comprises a sliding bearing 42 formed by a through-hole provided with a ring that allows sliding and pivoting, through the suspension arm 22, of a cylindrical single-arm fork 34. The single-arm fork 34 is, via one of the ends thereof, pivotably linked with the wheel 3 in order to allow it to turn and, by the other end thereof, is pivotably linked with a rocker arm 43.

The rocker arm 43 is mounted on the suspension arm 22, on which it pivots, and is pivotably linked, on one side with the single-arm fork 34 and on the other side with a damper-spring combination 27 connected to the chassis beam 12. Thus, the vertical movements of the wheel 3, allowed by sliding the single-arm fork 34 in the sliding bearing 42, are transferred by the rocker arm 43 to the damper-spring combination 27 in order to ensure the functions of the suspension device.

The single-arm fork 34 is secured, on the upper part thereof, to a steering lever 32 connected by a ball joint 33 to a control tie rod 31.

Figure 13:
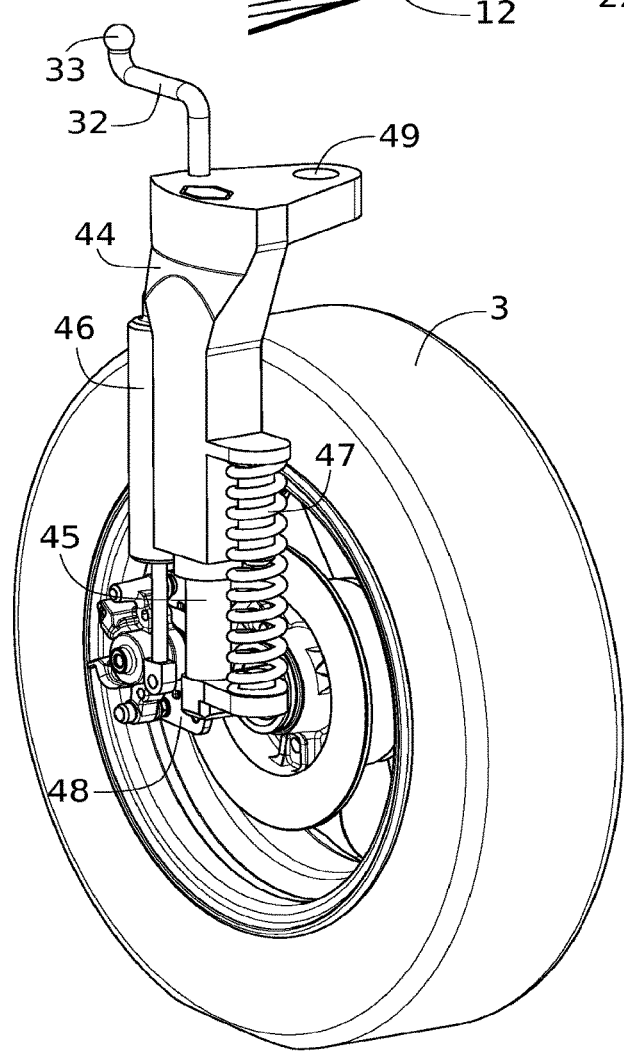
FIG. 13 shows a variant of the sixth embodiment.

FIG. 13 shows a variant of the sixth embodiment. According to this variant, the telescopic assembly 50 shown in FIG. 13 replaces the single-arm fork 34 of the previous embodiment.

FIG. 13 shows a casing 44, in which a rod 45 is mounted that can longitudinally slide in the casing 44. The ends of the rod 45, of the rod of a damper 46, and of a spring 47 are mounted on a wheel bearing 48 rotationally receiving the wheel 3. The other end of the damper 46 and of the spring 47 are mounted on the casing 44. The function of the suspension device is thus provided, by sliding the rod 45 in the casing 44, which movement opposes the spring 47 and the damper 46.

This telescopic assembly 50 is mounted on the suspension arm 22 of FIG. 12 by the bearing 49, which allows the casing 44, and therefore the telescopic assembly 50, to turn relative to the suspension arm 22, along a substantially vertical axis, so as to allow the wheel 3 to be turned. This turning movement is controlled by the steering lever 32 connected to the control tie rod 31 (not shown in FIG. 13) by the ball joint 33.

Other alternative embodiments can be implemented without departing from the scope of the invention. For example, the embodiments can be combined, and in particular each front wheel can have a different suspension and steering device.

Furthermore, the rear wheels also can be steering wheels and can implement the same suspension and steering devices.

As an alternative embodiment, each suspension arm is mounted for free rotation on the chassis beam along an axis that is, not parallel to the axis of the wheel cylinder, but that has an angle relative to the axis of the wheel cylinder.

Furthermore, even though the examples described refer to a single suspension arm 22 for each front wheel, it is possible, as an alternative embodiment, to provide a plurality of suspension arms for a front wheel.

The examples described refer to vehicles with a front wheel 4 diameter that is substantially the same as the diameter of the rear wheels 5. As an alternative embodiment, the diameter of the front and rear wheels can be different.

In the case of rear wheels that are larger than the front wheels, the suspension arms 22 advantageously extend around not only the wheel cylinder 15 from above, but also the rear wheels of the front vehicle in a convoy. Similarly, the control tie rods 31 are advantageously located not only above the wheel cylinder 15, but also above the rear wheels of the front vehicle in a convoy.

According to an alternative embodiment, in the case of rear wheels that are smaller than the front wheels, the suspension arms 22 can no longer extend around the wheel cylinder 15 from above, but a wheel cylinder that this time relates to the rear wheels. Similarly, according to this alternative embodiment, the control tie rods 31 can be located above not the wheel cylinder 15, but a wheel cylinder that this time relates to the rear wheels.

The invention claimed is:

1. A couplable automotive road vehicle comprising:
   a set of front wheels comprising two wheels and a set of rear wheels comprising at least one wheel;
   a chassis comprising a front part, on which the set of front wheels is mounted, and a rear part, on which the set of rear wheels is mounted;
   an articulated connection device, interposed between the front and rear parts of the chassis, and allowing the front part to pivot relative to the rear part about an articulation axis normal to a running plane of the vehicle;
   a steering device able to modify the turning angle of the two wheels of the front set, this steering device being able to be activated independently of the articulated connection device;
   front and rear couplings, respectively located at the front and at the rear of the vehicle;
   the front coupling being alternately movable between:
   a coupled position, in which this front coupling engages with a rear coupling, identical to the rear coupling of this vehicle and located on another vehicle, in order to mechanically attach, without any degree of freedom for yaw rotation, these vehicles together, and to align the front part of this vehicle with the rear part of the other vehicle; and
   an uncoupled position, in which these vehicles are detached from each other;
   the rear coupling being alternately movable between:
   a coupled position, in which this rear coupling engages with a front coupling, identical to the front coupling of this vehicle and located on another vehicle, in order to mechanically attach, without any degree of freedom for yaw rotation, these vehicles together, and to align the rear part of this vehicle with the front part of the other vehicle; and
   an uncoupled position, in which these vehicles are detached from each other,
   wherein a wheel cylinder is defined as being the cylindrical geometrical shape surrounding the two front wheels when they are not turned and extending transversely between the two front wheels, and in that:
   the front part of the chassis comprises a chassis beam extending parallel to the axis of the wheel cylinder and disposed behind the front wheels, outside the wheel cylinder;
   the front coupling comprises a yaw rigid coupling module mounted on the chassis beam between the two front wheels, this module having a coupling axis substantially coaxial to the wheel cylinder;
   the vehicle comprises, for each front wheel:
   a suspension arm mounted on the chassis beam and extending around the wheel cylinder from above;
   a control tie rod for the steering device controlling the pivoting of the wheel in order to modify the turning angle of the wheel, this tie rod being located above the wheel cylinder.

2. The vehicle as claimed in claim 1, wherein the size of the chassis beam, in the transverse direction of the vehicle, is greater than the size, in this transverse direction, of the yaw rigid coupling module.

3. The vehicle as claimed in claim 2, wherein the chassis beam extends, in the transverse direction, on either side of the yaw rigid coupling module until it arrives opposite the tire tread of each front wheel.

4. The vehicle as claimed in claim 1, wherein each suspension arm is disposed opposite the tire tread of the corresponding front wheel.

5. The vehicle as claimed in claim 1, wherein the steering device comprises, for each front wheel, a steering lever pivotably secured to the wheel and connected by a ball joint to the control tie rod, said ball joint being located outside the wheel cylinder and on the top of the wheel cylinder.

6. The vehicle as claimed in claim 5, wherein each suspension arm comprises, at the end thereof that is opposite the chassis beam, two flanges in the form of a jaw, a pivot of the steering device extending between the two flanges, and the steering lever being disposed between the two flanges.

7. The vehicle as claimed in claim 5, wherein each steering lever is disposed opposite the tire tread of the corresponding front wheel.

8. The vehicle as claimed in claim 1, wherein the yaw rigid coupling module comprises two coupling points defining a coupling axis parallel to the chassis beam.

9. The vehicle as claimed in claim 8, wherein the coupling axis is contained in a 30 centimeter diameter cylinder that is coaxial to the wheel cylinder.

10. The vehicle as claimed in claim 1, wherein it comprises a stabilizer bar connecting the two suspension arms and extending parallel to the chassis beam.

11. The vehicle as claimed in claim 1, wherein the suspension arm is bent in order to extend around the wheel cylinder from above.

12. The vehicle as claimed in claim 1, wherein each suspension arm is mounted for free rotation on the chassis beam along an axis parallel to the axis of the wheel cylinder.

13. The vehicle as claimed in claim 12, wherein each suspension arm comprises an extension extending from the top of the wheel cylinder toward the hub of the corresponding front wheel, by running alongside the side of the corresponding front wheel, in the direction of the wheel pivot.

14. The vehicle as claimed in claim 1, wherein each suspension arm is fixedly mounted on the chassis beam.

15. An automotive road convoy, comprising at least two attached automotive road vehicles, wherein each of these vehicles is a vehicle according to claim 1, these vehicles being attached in pairs by means of the respective front and rear couplings of these vehicles.

* * * * *